United States Patent Office 3,429,931
Patented Feb. 25, 1969

---

3,429,931
1-HALO-1-NITRO DISULFIDES
Joseph G. E. Fenyes and Gustave K. Kohn, Berkeley, Calif., assignors to Chevron Research Company, San Francisco, Calif., a corporation of Delaware
No Drawing. Filed Sept. 7, 1965, Ser. No. 485,613
U.S. Cl. 260—608     6 Claims
Int. Cl. A01n *149/16;* C07c *149/16, 149/30*

ABSTRACT OF THE DISCLOSURE

Disulfides of the formula $$\begin{array}{c} NO_2 \\ | \\ R-C-S-S-R' \\ | \\ X \end{array}$$

wherein X is halogen of atomic number 17 to 35, R is alkyl of 1 to 5 carbon atoms and R' is an organic radical derived from a sulfhydryl-containing compound. For instance, R' may be alkyl, cycloalkyl, haloalkyl, aryl, carboxyacyl, carboxyalkyl, carboxyaryl or alkoxycarbonylalkyl. These disulfides are useful as fungicides.

---

This invention is directed to a new class of organic disulfides and their use in biological applications. More particularly, this invention concerns a group of organic disulfides which contain the 1-halo-1-nitroalkylthio group and their use as fungicides.

The unique class of compounds of this invention may be considered as being made up of two portions each derived from separate precursors. The 1-halo-1-nitroalkylthio group which partly characterizes all of these new disulfides derives from 1-halo-1-nitroalkylsulfenyl halide The remaining portion of the compounds of the present invention derives from an organic sulfhydryl compound.

In terms of structure, the disulfides of this invention may be represented by the formula:

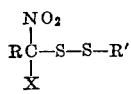

wherein

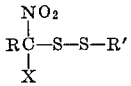

is the portion derived from the sulfenyl halide, and —S—R' is that derived from the sulfhydryl compound. In the above formula, X is halogen of atomic number 17 to 35, i.e., chlorine and bromine, and R is alkyl of from 1 to 5 carbon atoms.

The 1-halo-1-nitroalkylsulfenyl halide precursor of the disulfides of this invention may be prepared by reacting the alkali or alkaline earth metal salt of a primary nitroalkane with sulfur monochloride in the presence of an inert, anhydrous, nonhydroxylic medium, such as ether, to form a bis-(1-nitroalkyl) disulfide and cleaving the disulfide with halogen, preferably chlorine. Examples of appropriate sulfenyl halide precursors are: 1-chloro-1-nitroethylsulfenyl chloride, 1-bromo-1-nitroethylsulfenyl chloride, 1 - chloro - 1 - nitropropyl sulfenyl bromide, 1-bromo-1-nitrobutylsulfenyl chloride, 1-chloro-1-nitrohexylsulfenyl bromide, etc.

The sulfhydryl residue, —SR', may originate from a wide variety of organic sulfhydryl compounds. Hence R' represents a large group of organic radicals. In accordance with this invention R' is an organic radical consisting of from 1 to 25 carbon atoms, from 0 to 10 heteroatoms selected from the group consisting of oxygen, nitrogen, sulfur, and halogen of atomic number 17 to 35, i.e., chlorine and bromine, and hydrogen. More usually, R' will represent an organic radical consisting of from about 1 to 15 carbon atoms, from 0 to 3 oxygen atoms, 0 to 1 halogens of atomic number 17 to 35 and hydrogen. The hydrogen of these compounds will satisfy the valences of the carbon atoms not fully satisfied by other carbon atoms or heteroatoms and the valences of those heteroatoms whose valences are not fully satisfied by carbon or other heteroatoms. Generally, the molecular weight of R' will be less than about 500 and more generally less than 100. Additionally, it is preferred that R' be free of nucleophilic groups such as sulfhydryl, amino, N-substituted amino, imino, hydroxyl, etc. and free of aliphatic unsaturation, i.e., ethylenic or acetylenic unsaturation. The presence of such nucleophilic groups may cause degradation of the disulfides via attack of the halogen groups in them. As used herein the term "nucleophilic group" defines electron-donating groups which would tend to react with the halogen of the 1-halo-1-nitroalkyl portion of the disulfides of this invention under normal storage conditions. Preferably, R' represents a hydrocarbyl radical free of such nucleophilic groups and aliphatic unsaturation having from 1 to 25 carbons. Even more preferred are the compounds where R' is alkyl of 1 to 10 carbons.

The organic sulfhydryl compounds from which —S—R' is derived include saturated aliphatic mercaptans, saturated alicyclic mercaptans, aromatic mercaptans such as thiophenols, benzyl mercaptans, naphthyl mercaptans, etc., thiocarboxylic acids, thiodicarboxylic acids, mercapto-substituted carboxylic acids, mercapto-substituted esters of carboxylic acids and other similar sulfhydryl-containing compounds. Furthermore, these organic sulfhydryl precursors may be singly substituted with inert substituents such as chloro, bromo and alkyl groups.

Correspondingly, R' may represent alkyl, cycloalkyl, haloalkyl, aryl such as phenyl, halophenyl, naphthyl, benzyl, halobenzyl, tolyl, etc., carboxyacyl such as acetyl, propanoyl, butyryl, benzoyl, naphthoyl, etc., carboxyalkyl, carboxyaryl such as carboxyphenyl, carboxyhalophenyl, etc., alkoxycarbonylalkyl, etc.

The following structural formulae illustrates some of the various groups of disulfides which fall within this invention.

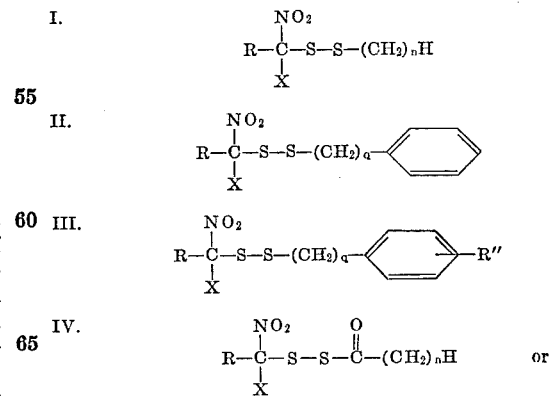

V. 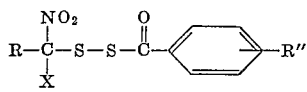

VI. 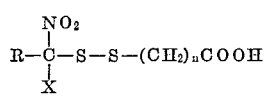

VII. 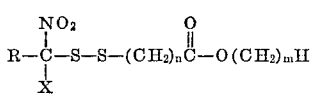

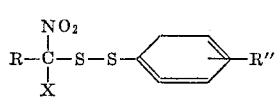

wherein $m$ and $n$ are integers from 1 to 10, preferably from 1 to 4, $q$ is an integer from 0 to 1, R″ is selected from the group consisting of lower alkyl, e.g. 1–6 carbon atoms, nitro, carboxyl, chloro and bromo and R and X are as previously defined.

Illustrative of the disulfides according to this invention are: methyl-1-bromo-1-nitroethyl disulfide, methyl-1-chloro-1-nitroethyl disulfide, methyl-1-chloro-1-nitropropyl disulfide, methyl-1-bromo-1-nitropropyl disulfide, ethyl-1-chloro-1-nitroethyl disulfide, propyl-1-bromo-1-nitroethyl disulfide, propyl-1-chloro-1-nitrobutyl disulfide, hexyl-1-chloro-1-nitroethyl disulfide, octyl-1-chloro-1-nitrohexyl disulfide, dodecyl-1-bromo-1-nitroethyl disulfide, cyclohexyl-1-chloro-1-nitropropyl disulfide, cyclobutyl-1-chloro-1-nitropropyl disulfide, phenyl-1-chloro-1-nitroethyl disulfide, benzyl-1-chloro-1-nitroethyl disulfide, p-chlorophenyl-1-chloro-1-nitroethyl disulfide, p-chlorophenyl-1-bromo-1-nitrobutyl disulfide, p-bromophenyl-1-bromo-1-nitropropyl disulfide, p-tolyl-1-chloro-1-nitroethyl disulfide, p-nitrophenyl-1-chloro-1-nitroethyl disulfide, acetyl-1-chloro-1-nitroethyl disulfide, acetyl-1-bromo-1-nitrobutyl disulfide, propanoyl-1-chloro-1-nitropropyl disulfide, butyryl-1-chloro-1-nitroethyl disulfide, hexanoyl-1-bromo-1-nitroethyl disulfide, decanoyl-1-chloro-1-nitropropyl disulfide, octadecanoyl - 1 - chloro-1-nitropropyl disulfide, benzoyl-1-chloro-1-nitroethyl disulfide, benzoyl-1-bromo-1-nitrohexyl disulfide, toluoyl-1-chloro-1-nitroethyl disulfide, 1-chloro-1-nitroethyldithio acetic acid, 3-(1-chloro-1-nitroethyldithio) propionic acid, 4-(1-chloro-1-nitropropyldithio) butanoic acid, 4-(1-bromo-1-nitrohexyldithio) pentanoic acid, 8-(1-chloro-1-nitroethyldithio) decanoic acid, ethyl-1-chloro-1-nitroethyldithio acetate, methyl-3-(1-bromo-1-nitrobutyldithio) propionate, butyl-8-(1-chloro-1-nitrohexyl) octonoate, etc.

As previously indicated, the novel disulfides of this invention may be prepared by reacting a 1-halo-1-nitroalkylsulfenyl halide with an organic sulfhydryl compound. This displacement reaction may be carried out neat or in the presence of inert solvents such as benzene, toluene, hexane, heptane, ether, etc. In order to facilitate the rate of reaction, heat may be applied. For instance, the reaction may be conducted at the reflux temperature of the solvent.

The following examples are presented to illustrate methods by which the novel disulfides of this invention are prepared. These examples are offered only by way of illustration and are not limiting on the invention described herein.

EXAMPLE I

A 9.5 gm.-portion of 1-chloro-1-nitropropylsulfenyl chloride dissolved in 50 mls. hexane was charged to a flask and cooled to −5° C. Into this mixture were bubbled 2.4 gm. of methyl mercaptan. The mixture was allowed to stand for approximately 14 hours after which the hexane was stripped off. Distillation to 80° C. at 1.0 mm. Hg gave 9.4 gms. ethyl-1-chloro-1-nitropropyl disulfide. This compound was observed as a pale yellow oil.

Its analysis was theory, percent Cl, 17.6; S, 31.8. Found: Cl, 18.0; S, 30.4.

EXAMPLE II

A 3.8 gm.-portion of p-chlorothiophenol dissolved in 50 mls. ether was charged to a vessel. To this mixture were added 4.65 gms. 1-chloro-1-nitroethylsulfenyl chloride. The contents were stirred for approximately 14 hours after which the ether was stripped off. Filtering of the product through celite gave 5.5 gms. p-chlorophenyl-1-chloro-1-nitroethyl disulfide.

This compound was observed as a yellow oil having the following analysis: Theory, percent Cl, 25.0; S, 22.5. Found: Cl, 25.9; S, 21.3.

EXAMPLE III

A 2.5 gm.-portion of thiolacetic acid was placed in a test tube and cooled in an ice bath. To this acid were added dropwise 5.5 gms. 1-chloro-1-nitroethylsulfenyl chloride while stirring with a wooden stirrer. Evolution of gaseous HCl was observed. The mixture was allowed to stand in an ice bath for one-half hour and then was stripped to 30° C. under a water vacuum. The stripped mixture was further stripped to 50° C. about 0.1 mm. Hg and then fractionally distilled. A 6.3 gm.-portion of acetyl-1-chloro-1-nitroethyl disulfide was recovered at 73° C., 0.06 mm. Hg to 80° C., 0.1 mm. Hg.

This compound was observed as a colorless oil having the following analysis: Theory, percent Cl, 16.5; S, 29.7. Found: Cl, 13.90; S, 30.65.

EXAMPLE IV

A 5.3 gm.-portion of 3-mercaptopropionic acid dissolved in 50 ml. of benzene was charged to a vessel. To this mixture was added a 9.5 gm.-portion of 1-chloro-1-nitropropylsulfenyl chloride. After the addition, the temperature was raised from ambient to 60° C. for 5–7 minutes. The benzene was evaporated and the product was then stripped to 74° C. about 0.2 mm. Hg. A 12 gm.-portion of 3-(1-chloro-1-nitropropyldithio) propionic acid was recovered as a dark, very viscous liquid.

Its analysis was: Theory, percent Cl, 13.65; S, 24.7. Found: Cl, 13.93; S, 24.42.

EXAMPLE V

A 5.3 gm.-portion of 1-chloro-1-nitroethylsulfenyl chloride dissolved in 20 ml. benzene was charged to a vessel. To this mixture was added dropwise an 8.8 gm.-portion of methyl thioglycolate in 30 ml. benzene. The contents were boiled gently for 20–30 minutes while being stirred. The benzene was then evaporated at subatmospheric pressure and the product was stripped to 68° C. about 0.2 mm. Hg. An 11.5 gm.-portion of methyl-1-chloro-1-nitroethyldithio acetate was recovered as a dark orange liquid.

Its analysis was: Theory, percent Cl, 14.43; S, 26.10. Found: Cl, 14.28; S, 25.72.

EXAMPLE VI

A 9.5 gm.-portion of 1-chloro - 1 - nitropropylsulfenyl chloride dissolved in benzene was charged to a vessel. To this mixture was added a 6.2 gm.-portion of benzyl mercaptan dissolved in benzene. The addition took approximately 30 minutes. The mixture was stirred and heated to a gentle reflux for a 30 minute period after which the benzene was stripped off at subatmospheric pressure. Further stripping yielded 14.7 gm. of benzyl-1-chloro-1-nitropropyl disulfide. Its analysis was: Theory percent Cl, 12.76; S, 23.08. Found: Cl, 11.90; S, 23.1.

The analyses of other analogously prepared disulfides of this invention are contained in Table I.

TABLE I

| Compound | Analysis | | |
|---|---|---|---|
| | Element | Theory | Found |
| 1-chloro-1-nitropropyldithio acetic acid | Cl | 14.43 | 14.30 |
| | S | 26.09 | 26.35 |
| 1-chloro-1-nitroethyldithio acetic acid | Cl | 15.3 | 16.60 |
| | S | 27.63 | 27.35 |
| 3-(1-chloro-1-nitroethyldithio)propionic acid | Cl | 14.4 | 15.72 |
| | S | 26.1 | 25.80 |
| Ethyl-1-chloro-1-nitroethyl disulfide | Cl | 17.57 | 20.48 |
| | S | 31.78 | 30.65 |
| 1-chloro-1-nitroethyl-p-bromophenyl disulfide | Br | 24.31 | 24.50 |
| | S | 19.51 | 19.15 |
| | Halogen$^\ominus$ meq./g. | 6.05 | 6.66 |
| 1-chloro-1-nitropropyl-p-bromophenyl disulfide | Br | 23.32 | 23.55 |
| | S | 18.71 | 19.78 |
| | Halogen$^\ominus$ meq./g. | 5.85 | 5.84 |
| 1-chloro-1-nitroethyl-p-chlorobenzyl disulfide | Cl | 23.74 | 23.35 |
| | S | 21.50 | 21.24 |
| S-(1-chloro-1-nitroethylthio)-ethyl xanthate | Cl | 13.54 | 13.45 |
| | S | 36.72 | 36.72 |
| S-(1-chloro-1-nitropropylthio)-ethyl xanthate | Cl | 12.85 | 12.73 |
| | S | 34.87 | 35.35 |
| 1-chloro-1-nitropropyl-p-chlorobenzyl disulfide | Cl | 22.71 | 24.60 |
| | S | 20.54 | 21.18 |
| 2-methoxyethyl 1-chloro-1-nitroethyldithioacetate | Cl | 12.24 | 12.82 |
| | S | 22.13 | 21.73 |
| 2-methoxyethyl 1-chloro-1-nitro-propyldithioacetate | Cl | 11.67 | 11.58 |
| | S | 21.11 | 21.58 |
| 1-chloro-1-nitropropyldithiomethyl acetate | Cl | 13.65 | 13.88 |
| | S | 24.69 | 24.22 |
| 2-(1-chloro-1-nitroethyldithio)propionic acid | Cl | 14.37 | 14.38 |
| | S | 25.99 | 25.63 |
| 2-(1-chloro-1-nitropropyldithio)propionic acid | Cl | 13.60 | 14.60 |
| | S | 24.59 | 24.30 |
| o-Carboxyphenyl-1-chloro-1-nitropropyl disulfide | Cl | 11.52 | 11.18 |
| | S | 20.83 | 20.41 |

The novel disulfides of this invention are useful as fungicides. A number of the compounds of this invention were tested for fungicidal activity by means of the mycelial drop test. This test is designed to measure the fungitoxic activity of fungicidal amounts of each chemical in terms of their degree of inhibition upon mycelial growth. Each fungitoxic compound to be tested was dissolved in acetone in dilutions as indicated in Table II. Paper discs previously inoculated by impregnation with equal amounts of particular fungus mycelium and placed on potato dextrose agar medium were treated by applying a precise and equal volume of each of these fungicidal solutions to their center. Following treatment with the fungitoxic amount of the chemical, the discs were incubated along with inoculated but untreated control discs at ambient temperatures until such time that these untreated control discs were filled with mycelial growth. Activity of the fungitoxic chemical tested was determined by comparative measurements of radii of mycelial growth away from the edge of the disc in treated and untreated samples. From this comparison a percent inhibition of growth area is determined. The results of this test for various fungitoxic chemicals on the particular fungus mycelium are indicated in Table II.

Aside from the specific formulation and application of the class of compounds of the invention as represented by the foregoing tests, these compounds may be dispersed in or upon other inert liquid and solid carriers, such as inert clay, xylenes, etc. The solid carriers may be in the form of a dust, or used in conjunction with a suitable wetting agent to form a wettable powder. The fungitoxic compounds of the invention may also be formulated with other solvents, dispersing agents, or emulsifying agents. Further, these compounds may not only be applied alone or in mixtures with other compounds of the disclosed class, but may also be used in combination with other active toxicants in the formulation of fungicidal compositions.

The compounds may be applied to any environmental area which is a host to fungus or susceptible to fungus attack. For example, the fungicidal compositions may be sprayed or otherwise applied directly to a plant or other host, may be applied to the plant seed, sprayed upon the soil or other plant environment, or used in similar ways so as to effect the control of fungus and fungus diseases.

As will be evident to those skilled in the art, various modifications on this invention can be made or followed,

TABLE II

| Compound | Concentration, p.p.m. | Fungus Mycelium, percent Inhibition | | | |
|---|---|---|---|---|---|
| | | Pythium | Fusarium | Rhizoctonia | Verticillium |
| Methyl-1-chloro-1-nitroethyl disulfide | 500 | 100 | 98 | 98 | 90 |
| p-Chlorophenyl-1-chloro-1 nitroethyl disulfide | 500 | 100 | 40 | 78 | |
| Acetyl-1-chloro-1-nitro-ethyl disulfide | 500 | | | 61 | 100 |
| 1-chloro-1-nitroethyldithio-acetic acid | 500 | 100 | | 61 | |
| 3-(1-chloro-1-nitropropyldithio) propionic acid | 500 | 100 | 10 | 100 | |
| 1-chloro-1-nitropropyldithio-acetic acid | 500 | 100 | | 78 | |

What is claimed is:

1. Disulfide of the formula $$R-\underset{\underset{X}{|}}{\overset{\overset{NO_2}{|}}{C}}-S-S-R'$$

wherein X is halogen of atomic number 17 to 35, R is alkyl of 1 to 5 carbon atoms and R' is a hydrocarbyl radical of about 1 to 15 carbon atoms which is free of aliphatic unsaturation or phenyl singly substituted with nitro, chloro or bromo or benzyl singly substituted with nitro, chloro or bromo.

2. Disulfide of the formula $$R-\underset{\underset{X}{|}}{\overset{\overset{NO_2}{|}}{C}}-S-S-R'$$

wherein X is halogen of atomic number 17 to 35, R is alkyl of 1 to 5 carbon atoms and R' is a hydrocarbyl radical of about 1 to 15 carbon atoms which is free of aliphatic unsaturation.

3. An organic disulfide of the formula $$R-\underset{\underset{X}{|}}{\overset{\overset{NO_2}{|}}{C}}-S-S-R'$$

wherein X is halogen of atomic number 17 to 35, R is alkyl of from 1 to 5 carbon atoms and R' is alkyl of from 1 to 10 carbon atoms.

4. Methyl-1-chloro-1-nitroethyl disulfide.
5. Ethyl-1-chloro-1-nitroethyl disulfide.
6. p-Chlorophenyl-1-chloro-1-nitroethyl disulfide.

No references cited.

CHARLES B. PARKER, *Primary Examiner.*

D. R. PHILLIPS, *Assistant Examiner.*

U.S. Cl. X.R.

260—453, 481, 539, 488, 516; 424—336